(12) United States Patent
Rampen et al.

(10) Patent No.: US 7,793,496 B2
(45) Date of Patent: Sep. 14, 2010

(54) INFINITELY VARIABLE TRANSMISSION HYDRAULIC HYBRID FOR ON AND OFF HIGHWAY VEHICLES

(76) Inventors: William Hugh Salvin Rampen, 1 Merchiston Crescent, Edinburgh (GB) EH10 5AN; Alfred E. Lynn, 2538 Black Pine Trail Dr., Troy, MI (US) 48098

(*) Notice: Subject to any disclaimer, the term of this patent is extended or adjusted under 35 U.S.C. 154(b) by 579 days.

(21) Appl. No.: 11/285,382

(22) Filed: Nov. 22, 2005

(65) Prior Publication Data

US 2006/0118346 A1 Jun. 8, 2006

Related U.S. Application Data

(60) Provisional application No. 60/629,563, filed on Nov. 22, 2004.

(51) Int. Cl.
*F16D 31/02* (2006.01)
(52) U.S. Cl. ............................ 60/414; 60/487
(58) Field of Classification Search ............... 60/414, 60/487, 489, 484; 180/165
See application file for complete search history.

(56) References Cited

U.S. PATENT DOCUMENTS

| | | | | |
|---|---|---|---|---|
| 3,175,354 A * | 3/1965 | Firth et al. | | 60/414 |
| 3,892,283 A * | 7/1975 | Johnson | | 180/165 |
| 4,126,994 A * | 11/1978 | Rockwell | | 60/484 |
| 4,313,351 A * | 2/1982 | Hagin | | 180/165 |
| 4,441,573 A * | 4/1984 | Carman et al. | | 180/165 |
| 4,592,454 A * | 6/1986 | Michel | | 60/414 |
| 4,888,949 A * | 12/1989 | Rogers | | 60/489 |
| 5,190,446 A * | 3/1993 | Salter et al. | | 417/297 |
| 5,259,738 A * | 11/1993 | Salter et al. | | 417/505 |
| 5,501,640 A * | 3/1996 | Hauser et al. | | 60/487 |
| 6,719,080 B1 * | 4/2004 | Gray, Jr. | | 60/414 |
| 7,311,163 B2 * | 12/2007 | Oliver | | 180/165 |
| 2003/0110765 A1 * | 6/2003 | Bailey et al. | | 60/413 |

OTHER PUBLICATIONS http://www.fibacanning.com, 2 pages, published 1995.
http://www.fibacanning.com/cumulo/hybrid.htm, 2 pages, published 1995.

* cited by examiner

*Primary Examiner*—Michael Leslie
(74) *Attorney, Agent, or Firm*—Berenato & White, LLC

(57) ABSTRACT

An infinitely variable transmission for use with an internal combustion engine is provided. Specifically, a prime mover is provided for driving a first hydraulic machine. The first hydraulic machine is arranged to drive a second hydraulic machine via a fluid line that connects the first and second hydraulic machines. The second hydraulic machine is operatively connected with an output element, such as a wheel to drive a vehicle. Each of the first and second hydraulic machines have electronically controllable valves for varying the speed and/or the torque of the first and second hydraulic machines thereby providing an infinitely variable transmission.

9 Claims, 27 Drawing Sheets

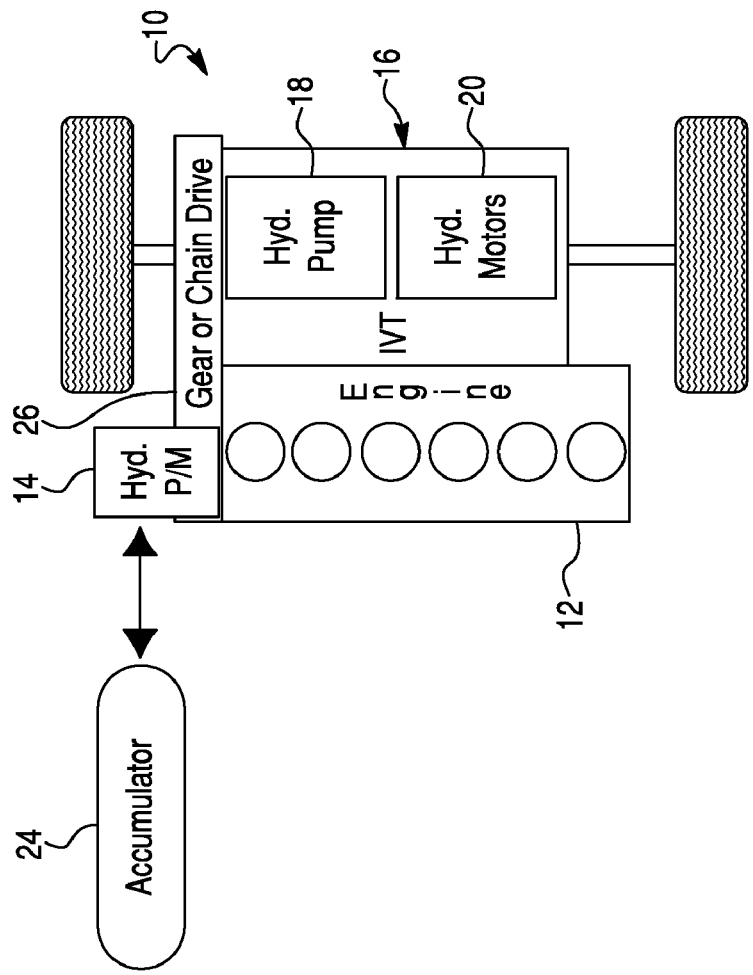
Fig. 2
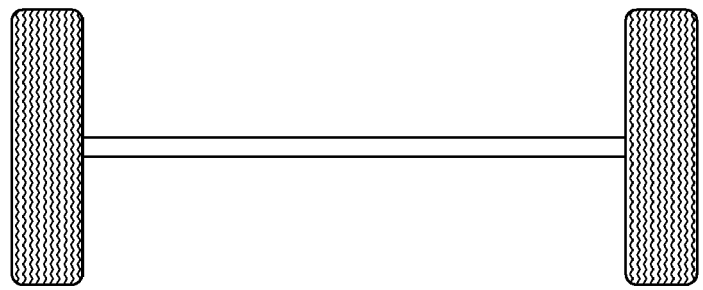

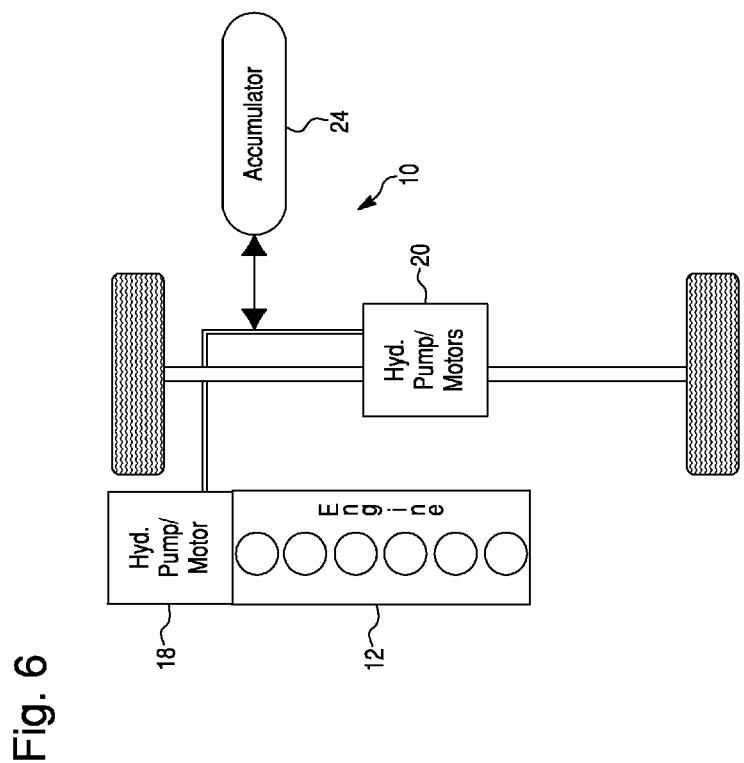
Fig. 6
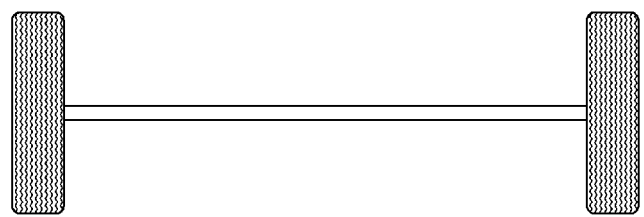

INFINITELY VARIABLE TRANSMISSION HYDRAULIC HYBRID FOR ON AND OFF HIGHWAY VEHICLES

RELATED APPLICATIONS

The present application claims priority to U.S. Provisional Patent Application No. 60/629,563, filed Nov. 22, 2004, which is hereby incorporated herein by reference.

FIELD OF THE INVENTION

This invention relates to an infinitely variable transmission with an internal combustion engine to improve fuel economy and emissions.

BACKGROUND OF THE INVENTION

Most hydraulic system loads need variable flow for their proper operation.

Conventionally this can be achieved in three ways. One is through flow control valves which alter the flow at the expense of energy loss. Variable swash-plate axial-piston machines are frequently employed for hydrostatic drives where energy becomes a consideration. Less commonly, a fixed displacement pump can be driven by a variable speed prime-mover. The Digital Displacement™ technique, developed by Artemis Intelligent Power Limited of Edinburgh, Scotland, provides yet another way of controllably transferring energy between mechanical and fluid power.

The basic structure of a Digital Displacement machine 100, as shown in FIGS. 27 and 28, is similar to the conventional reciprocating machine, with poppet valves 102 connecting to the low and high-pressure manifolds of each cylinder. But, instead of being self-acting, each of the poppet valves 102 is equipped with an electro-magnetic actuator 104. The valves 102 are operated by a micro-controller at precise times, near the ends of the stroke, in order to establish fluid connection between the moving piston and the appropriate manifold. This control allows cylinders to behave in any of the three ways, they can pump or motor—adding or subtracting fluid from the high pressure manifold—or they can be disabled. The function of each cylinder can be changed at each end of each stroke. As the valves 102 are actuated at times in the cycle when there is almost no pressure difference across them, the actuators 104 can be compact and use little power. Either permanent magnets or springs are used to maintain the disabled poppets at default positions. A micro-controller controls the valves from its output port via a bank of power semiconductors. Digital Displacement pump-motors are described in WO 91/05163 and WO2004/025122, the entire contents of each of which are incorporated herein by way of reference. The pump-motor can be run under pressure-control, flow-control or ternary-mode of cylinder enabling.

Advantages of using Digital the Displacement technique include:

Fast response: These machines are capable of attaining either full or zero output from any starting condition, in less than a single shaft revolution.

Compatibility with micro-processor: The compatibility with micro-processors allows the use of advanced control logic. Also the same machine can be used as a pump, a motor or both.

Higher efficiency: As disabled cylinders are not pressurized, losses are reduced in comparison with swash-plate machines leading to higher efficiency, especially at part load.

Multi-banking of pump-motors: Unlike conventional machines banks of radial pump-motors can be combined along a common shaft and used as a summing junction of both torque and power whilst providing isolation between services. Accumulators may be used in conjunction with some of the banks to transfer power in or out of the system. The radial configuration provides good force balancing and gives optimal space for the mechanical components like valves and bearings.

Digital Displacement technology is ideal for building series hydraulic hybrid transmissions for automotive applications. Series hydraulic hybrid transmissions built with Digital Displacement technology can offer impressive fuel savings, packagability improvements, performance enhancement and cost savings over conventional transmissions.

This invention is a highly efficient road-going vehicle featuring an infinitely variable regenerative fluid transmission. The aim of the program is to incorporate a hydraulic automatic transmission in a standard mass-market car.

Benefits of Digital Displacement (DD) with special relevance to transmission systems include: Unprecedented part load efficiency: Cars spend little of their lives at full power, so DD's part load efficiency is particularly suited to the automotive duty cycle.

Infinitely variable transmission ratio: An infinitely variable transmission ratio allows the engine to run at its optimal RPM at all times, giving 2-liter performance from a 1.6 liter engine and improved fuel efficiency. A DD transmission makes very high overdrive ratios possible but has an almost instant kick-down to allow the engine to achieve higher speed and power during acceleration.

No dissipative clutch or torque converter: Full wheel torque is possible with the engine at tickover.

Regenerative braking with accumulator storage: Storing reclaimed energy in a hydraulic accumulator greatly improves urban cycle efficiency.

Engine off operation: The vehicle can start moving using energy stored in the accumulator without any engine power at all, allowing the engine to stop when in traffic yet retaining immediate response to accelerator pedal input.

Four-wheel independent traction control: A Digital Displacement traction control system can provide completely independent hydraulic supplies for each wheel, each controllable at high bandwidth.

Digital Displacement technology replaces the port plates and swash plates in conventional hydraulic machines with computer controlled high speed solenoid valves. The core component of a Digital Displacement system is a hydraulic piston pump/motor 100, as shown in FIGS. 27 and 28, with actively controlled poppet valves 102 which rectify the flow into, and out of, each cylinder. The cylinders are generally disposed radially around an eccentric with valving around the periphery. Banks of cylinders can be assembled along a common crankshaft to allow multiple independent outputs. The valves are each operated by a small electro-magnetic latch so that they can be opened and closed on a stroke-by-stroke basis. The solenoid coil in each latch is activated by a power FET, which is in turn connected directly to the digital output of an embedded controller.

Each cylinder has two actively controlled poppet valves, one to each of the high and low pressure manifolds. When idling (left in the diagram below) the fluid flows in and out around the low pressure valve. The high pressure valve remains closed and isolates the reciprocating cylinder from the high pressure fluid. When pumping (right), the microprocessor closes the low pressure valve to send fluid to the high pressure service.

It is also possible to hold the high pressure valve open, taking fluid from the high pressure output.

The net result of the rapid sequenced valve actuation is that, at the end of each stroke, each cylinder can be reconfigured to either pump, motor or idle. By controlling the sequence of cylinder enablings, the machine can pump fluid to a hydraulic service or accept it back (while the returning fluid actually helps to drive the crankshaft of the machine) at infinitely variable flow-rates. The valve actuation decisions are occurring every four or five milliseconds in a typical multi-cylinder pump driven at industrial diesel speeds, which gives an effective frequency response greater than 20 Hz.

The hydraulic transmission shares its generation across many pumping modules and so avoids the highly stressed line contacts inherent in gear boxes. The ability of hydraulics to relieve at a safe working pressure avoids any potential over-stressing of the driveline. Short term storage in accumulators can smooth out energy supply from sources such as wind and waves. A continuously variable transmission ratio allows slow irregular motions to be transformed into the fast, steady rotation required by generators.

In the energy storage application, Digital Displacement pump/motors can fill and empty gas accumulators to alternately store and retrieve energy. The power rating limit is in the order of MW, while the response time is in milliseconds.

SUMMARY OF THE INVENTION

Accordingly, an improved vehicle is provided, which includes a prime mover arranged to drive a first hydraulic machine. The first hydraulic machine is arranged to drive a second (or further) hydraulic machine via a fluid connection. In turn, the second hydraulic machine is connected to drive at least one wheel for propelling the vehicle. Each of the first and further hydraulic machines have electronically-controllable valves for varying their speed and/or torque to provide an infinitely variable transmission for the vehicle.

According to another aspect of the invention, the vehicle includes an accumulator for storing fluid pressurised by at least one of the hydraulic machines during braking of the vehicle.

According to another aspect of the invention, the further hydraulic machine is operable in a motoring mode for driving the at least one wheel and in a pumping mode for pressurising the fluid.

According to a further aspect of the invention, the further hydraulic machine is connected to a differential for driving at least two wheels of the vehicle.

In still another aspect, the vehicle includes a plurality of further hydraulic machines, each arranged to drive one wheel of the vehicle.

According to yet another aspect, the first hydraulic machine is coupled to the prime-mover by a clutch, either or the overrunning or operable type, so that energy can be retrieved from the accumulator and used to drive one element of the hydraulic machine as a motor, such that it passes along a crankshaft to drive a second hydraulic element as a pump to provide motive power for the vehicle while the prime-mover is decoupled and switched off.

DESCRIPTION OF THE DRAWINGS

FIG. 2 is a second schematic diagram illustrating a vehicle drive train incorporating internal combustion engine that drives a hydraulic pump/motor.

FIG. 6 is a sixth schematic diagram illustrating a vehicle drive train incorporating internal combustion engine that drives a hydraulic pump/motor.

DETAILED DESCRIPTON

Combining a Digital Displacement pump or pump/motor driven by a combustion engine with a Digital Displacement pump/motor to create an Infinitely Variable Transmission creates a unique powertrain. Combining the Digital Displacement hardware together gives a highly efficient transmission with the ability to mechanically decouple the wheels from the engine and operate the engine on its ideal efficiency curve. Also, with an energy storage device like an accumulator, braking energy can be stored in the accumulator using the pump/motor. With the stored energy of the accumulator, engine stop/start can be accomplished with the energy stored in the accumulator.

The DD IVT and engine are coupled mechanically with and without a clutch between the engine and the pump or pump/motor and the pump/motor connected to the drive wheels through a ratio device or no ratio device, the pump or pump/motor supplies fluid flow and regulates pressure to the pump/motor. The pump/motor translates this flow and pressure to torque and speed through its output shaft. The accumulator is charged with fluid and pressure during the vehicle braking event using the wheel system pump/motor as a pump to pump fluid and pressure into the accumulator. As the wheel system pump/motor is being used as a pump, it generates a resistance to rotation and torque to the wheel system to add braking effort to the wheel system to slow the vehicle speed. The drawings attached show many architectures that the DD IVT hybrid system can be configured in a vehicle.

Controller area network (CAN) is a serial bus system especially suited for networking "intelligent" devices as well as sensors and actuators within a system or subsystem.

CAN is a serial bus system with multi-master capabilities, that is, all CAN nodes are able to transmit data and several CAN nodes can request the bus simultaneously. The serial bus system has real-time capabilities, and in CAN networks there is no addressing of subscribers or stations in the conventional sense, but instead, prioritized messages are transmitted.

A transmitter sends a message to all CAN nodes (broadcasting). Each node decides on the basis of the identifier received whether it should process the message or not. The identifier also determines the priority that the message enjoys in competition for bus access. The relative simplicity of the CAN protocol means that very little cost and effort need to be expended on personal training; the CAN chips interfaces make applications programming relatively simple. Introductory courses, function libraries, starter kits, host interfaces, I/O modules and tools are available from a variety of vendors permitting low-cost implementation of CAN networks. Low-cost controller chips implementing the CAN data link layer protocol in silicon and permitting simple connection to microcontrollers have been available since at least 1989.

Figure 1:
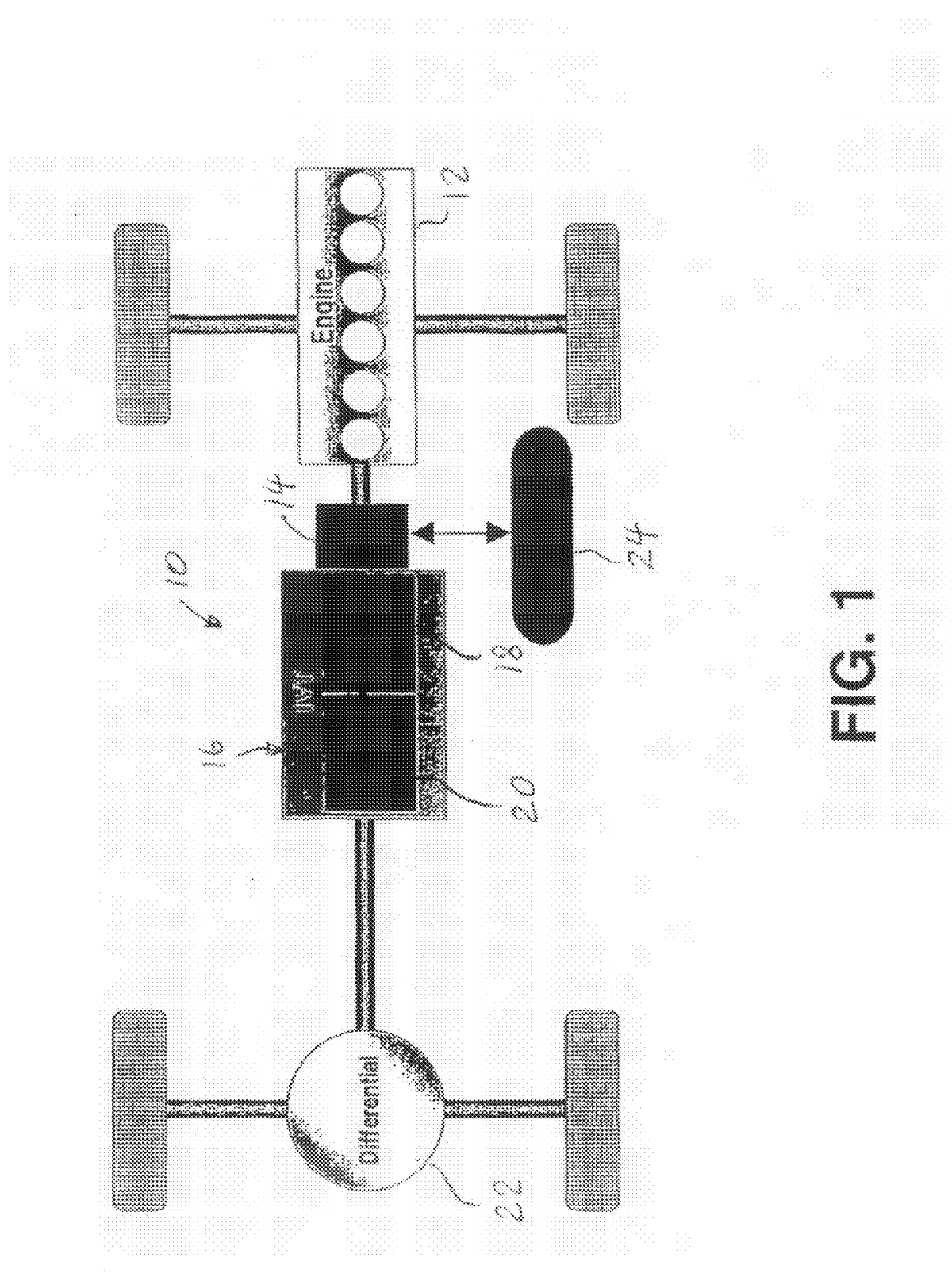
FIG. 1 is a schematic diagram illustrating a vehicle drive train incorporating internal combustion engine that drives a hydraulic pump/motor.
Figure 27:
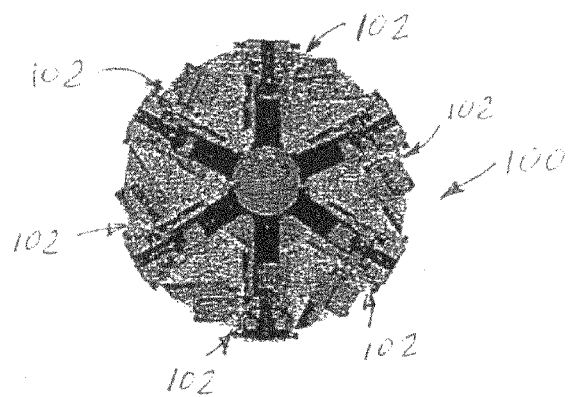
FIG. 27 is a schematic showing a 6-cylinder digital displacement pump/motor.
Figure 28:
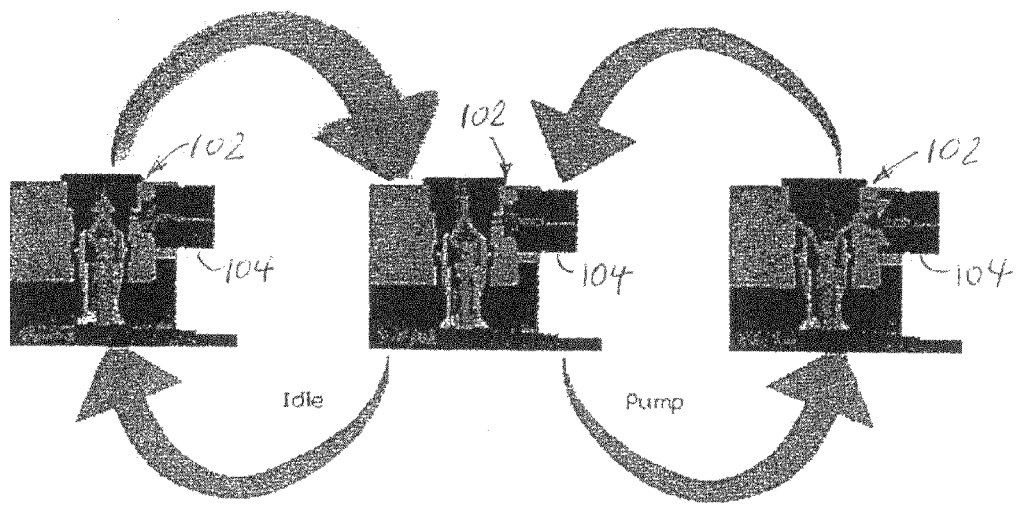
FIG. 28 is a schematic showing a valve action for the digital displacement pump/motor of FIG. 27.

In FIG. 1, a vehicle drive train 10 is illustrated having an internal combustion engine 12 as the primary source of torque which drives an auxiliary hydraulic pump/motor 14 which, in turn, delivers torque to a Digital Displacement infinitely variable transmission 16 including a first digital displacement hydraulic machine 18 and a second digital displacement hydraulic machine 20 which selectively drives a differential 22. The second hydraulic machine 20 is arranged to be driven by the first hydraulic machine 18 via a fluid connection. Each of the first and second hydraulic machines 18 and 20, respectively, has electronically-controllable valves, such as marked 102 in FIGS. 27 and 28, for varying their speed and/or torque to provide the infinitely variable transmission 16 for the vehicle drive train 10. An accumulator 24 is provided for the hydraulic circuit of the auxiliary hydraulic pump/motor 14. As illustrated in FIG. 1, the auxiliary hydraulic pump/motor 14 is disposed between the prime mover 12 and the infinitely variable transmission 16 in series therewith so as to drivingly connect the prime mover 12 to the first hydraulic machine 18 of the infinitely variable transmission 16 through the auxiliary hydraulic pump/motor 14.

Referring to FIG. 2, a vehicle drive train 10 is illustrated in which the internal combustion engine 12 drives an auxiliary hydraulic pump/motor 14 which, in turn, drives a Digital Displacement infinitely variable transmission 16 through a gear or chain drive 26. An accumulator 24 stores and delivers hydraulic power to and from the auxiliary hydraulic pump/motor 14.

Figure 3:
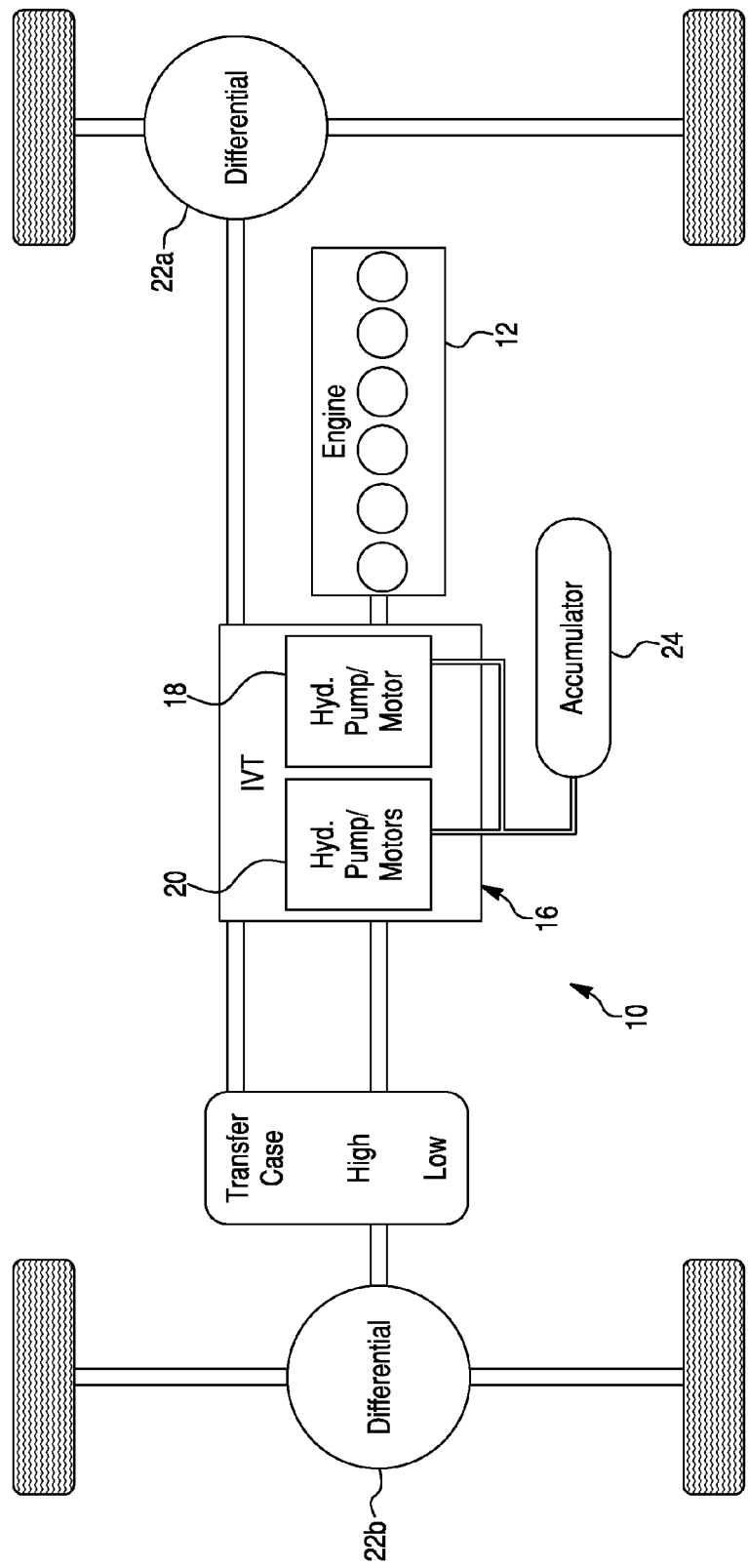
FIG. 3 is a third schematic diagram illustrating a vehicle drive train incorporating internal combustion engine that drives a hydraulic pump/motor.
Figure 4:
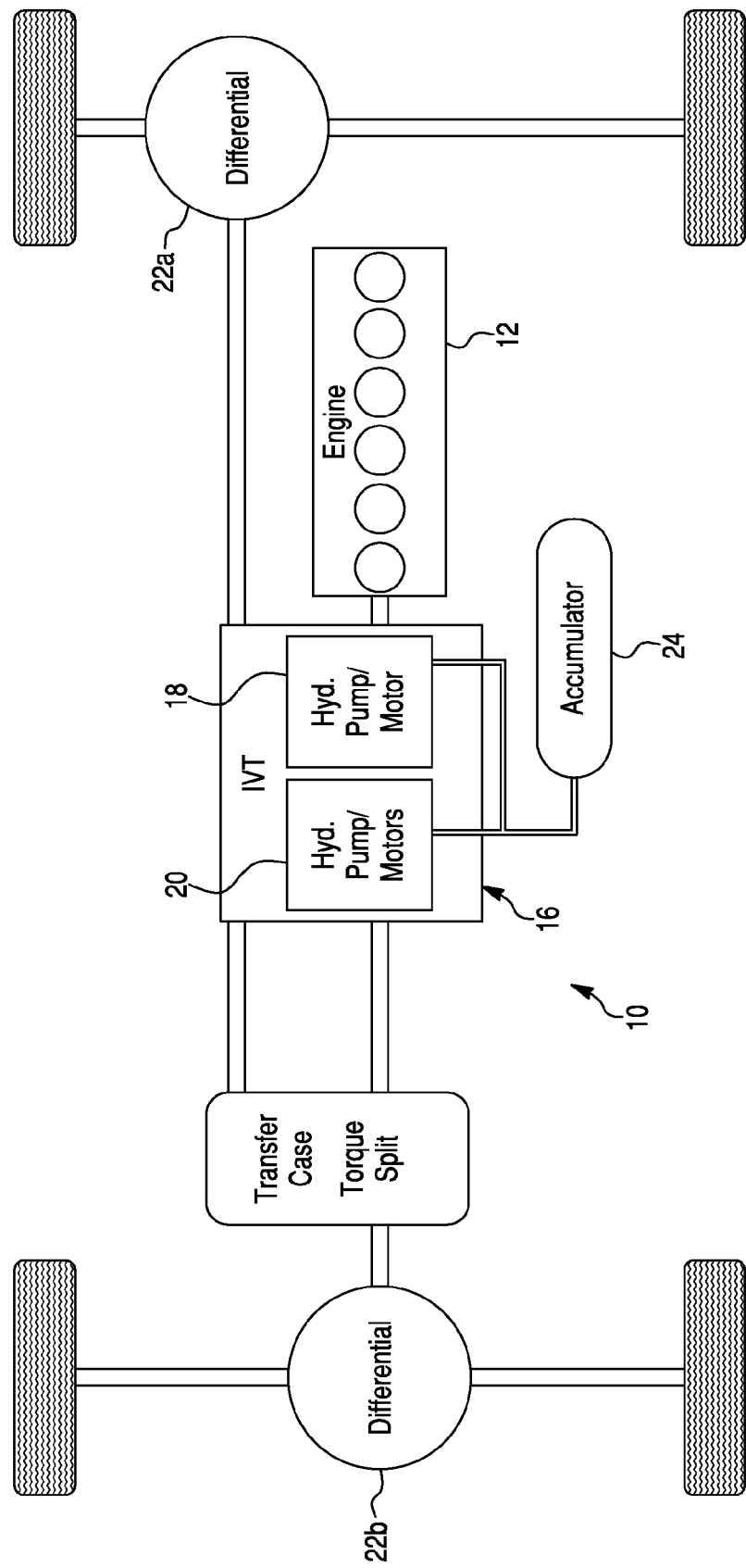
FIG. 4 is a fourth schematic diagram illustrating a vehicle drive train incorporating internal combustion engine that drives a hydraulic pump/motor.

In FIGS. 3 and 4, two embodiments are illustrated in which a vehicle drive train 10 having an internal combustion engine 12 as the primary source of torque which drives a Digital Displacement infinitely variable transmission 16 which selectively drives a differential (22a or 22b). A transfer case 28 divides torque between the front and rear differentials, 22a and 22b, respectively. An accumulator 24 is provided for the hydraulic circuit of the hydraulic infinitely variable transmission 16.

Figure 5:
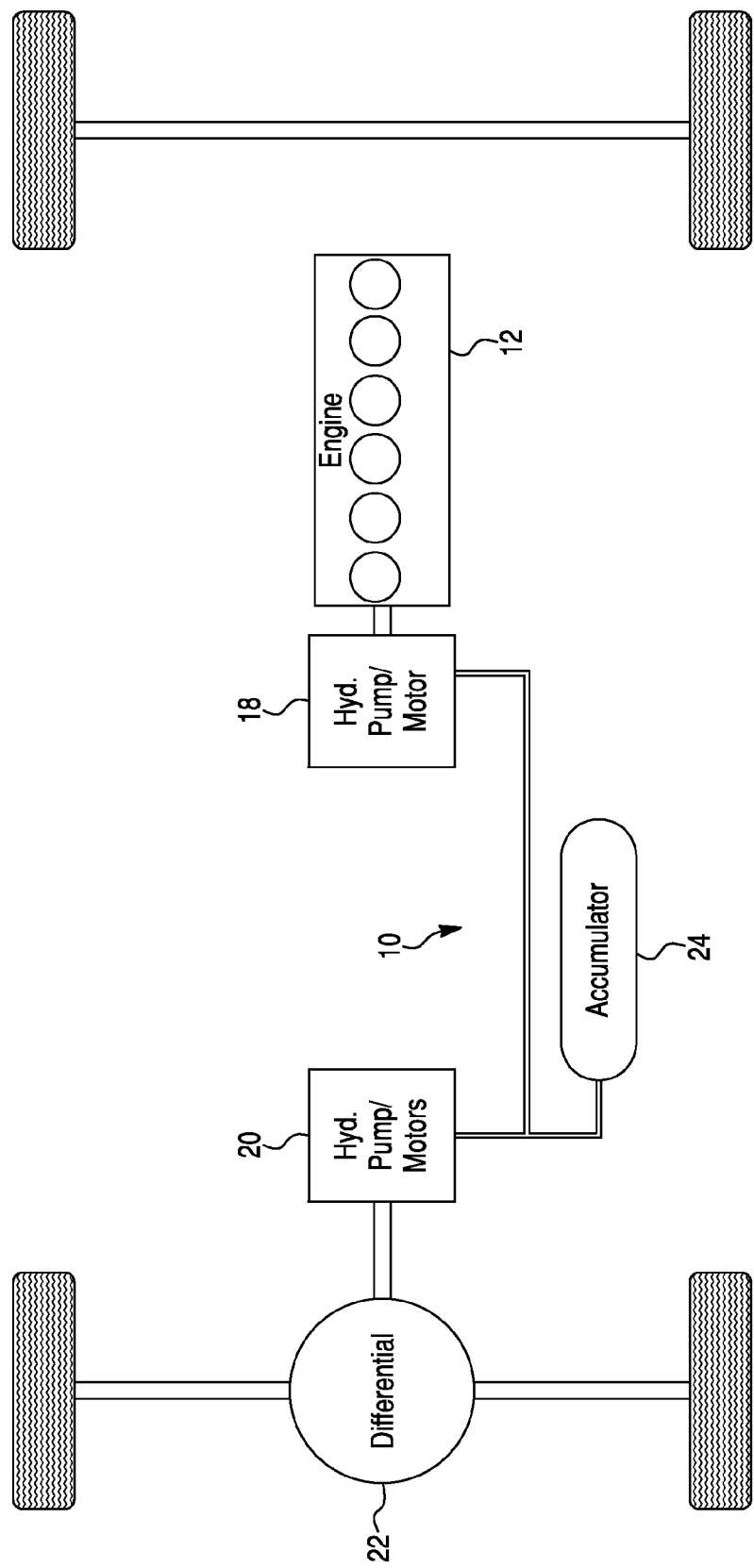
FIG. 5 is a fifth schematic diagram illustrating a vehicle drive train incorporating internal combustion engine that drives a hydraulic pump/motor.

In FIGS. 5 and 6, the drive trains 10 include an IC engine 12 that drives a hydraulic pump/motor assembly 18 and the dedicated pump/motor assembly 20 is provided for the differential 22 or axle assembly. An accumulator 24 stores and delivers hydraulic power to and from the pump/motor assemblies 18 and 20.

Figure 7:
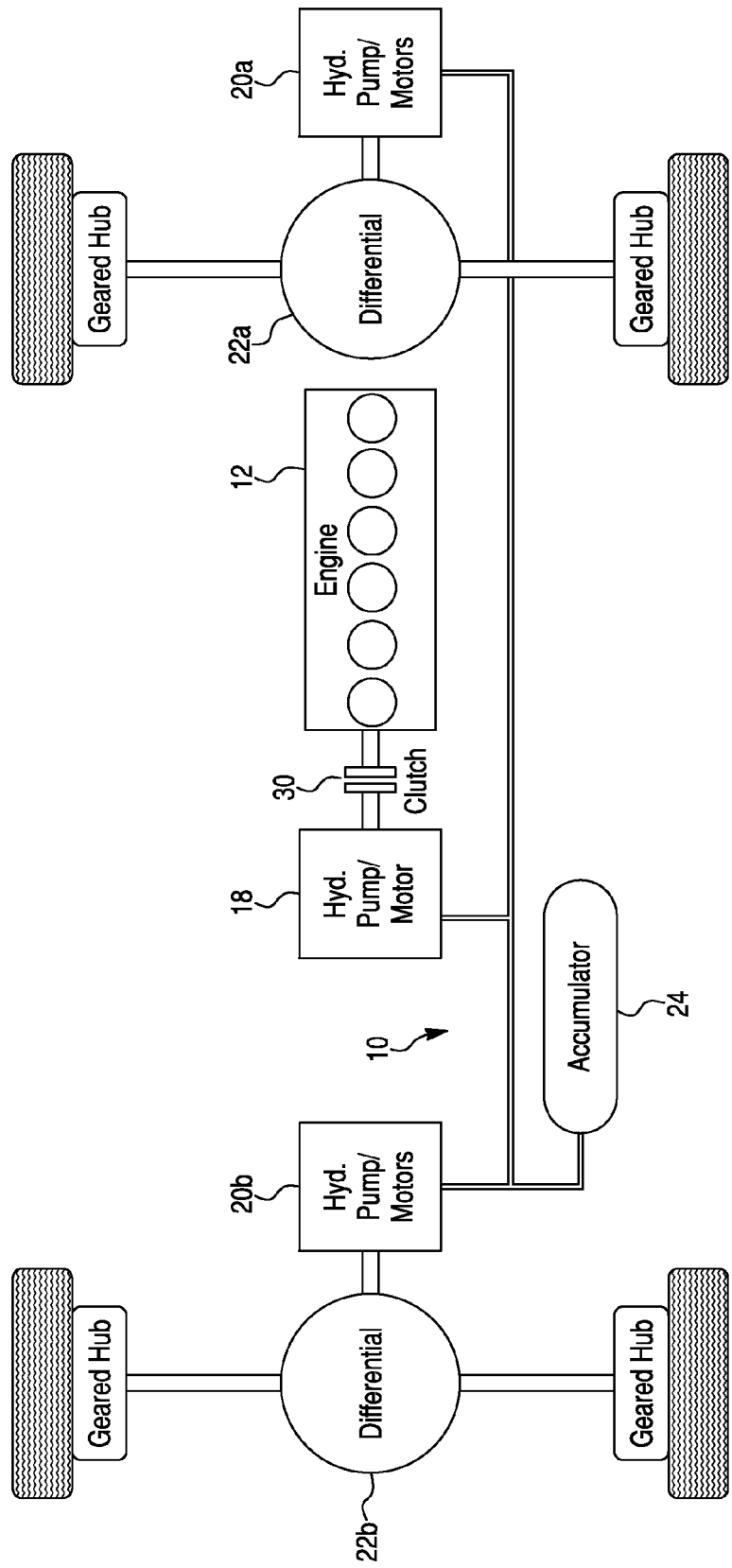
FIG. 7 is a seventh schematic diagram illustrating a vehicle drive train incorporating internal combustion engine that drives a hydraulic pump/motor.
Figure 8:
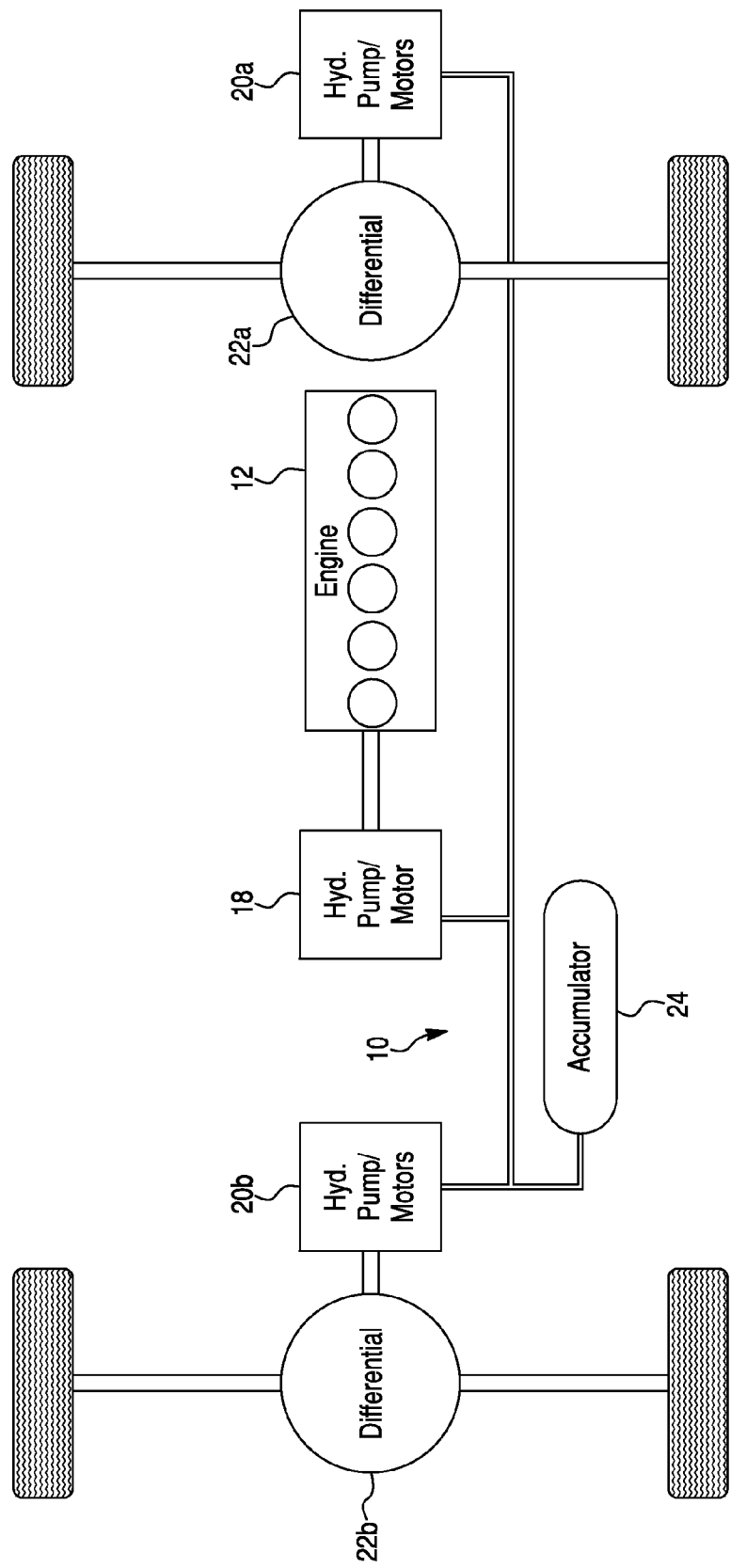
FIG. 8 is an eighth schematic diagram illustrating a vehicle drive train incorporating internal combustion engine that drives a hydraulic pump/motor.
Figure 9:
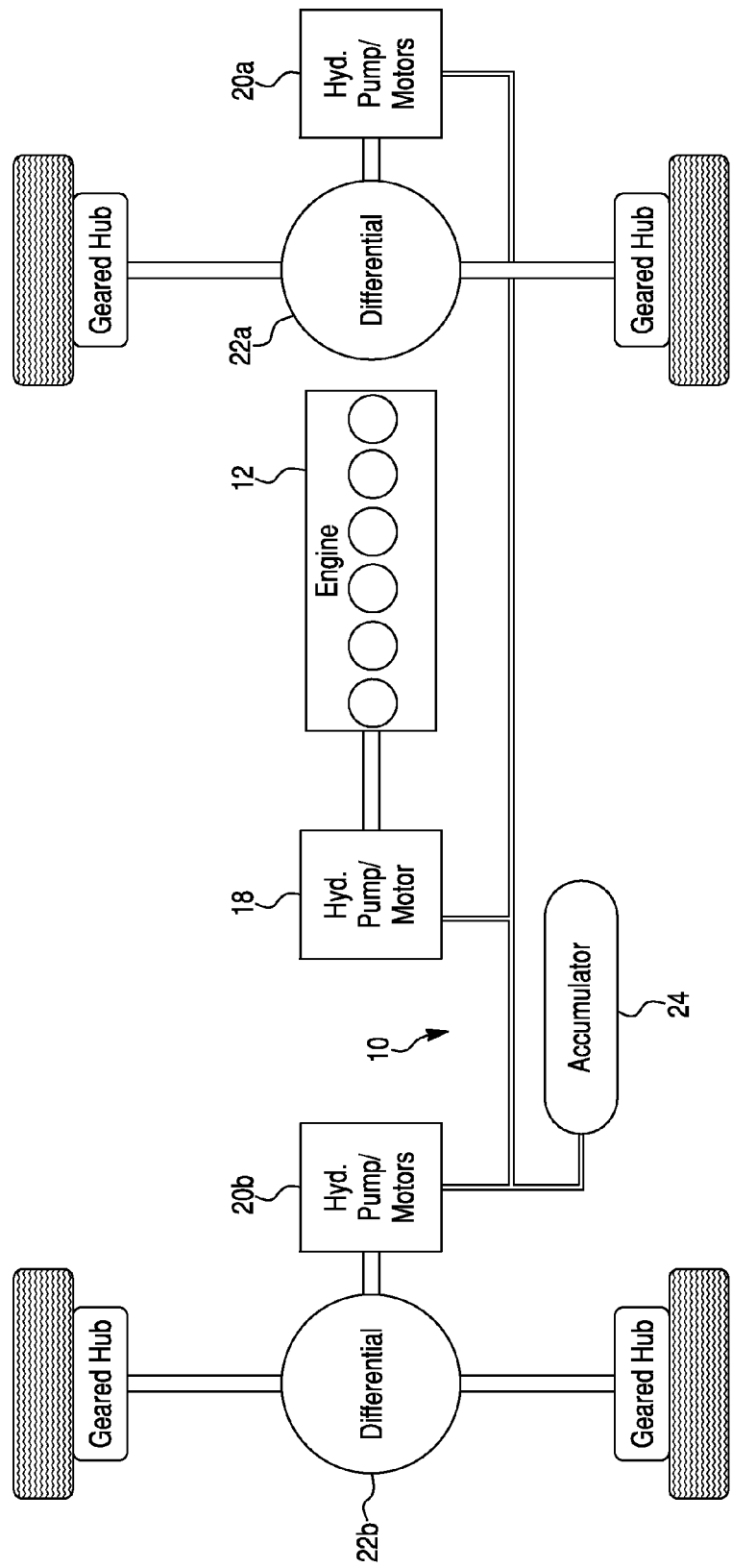
FIG. 9 is a ninth schematic diagram illustrating a vehicle drive train incorporating internal combustion engine that drives a hydraulic pump/motor.
Figure 10:
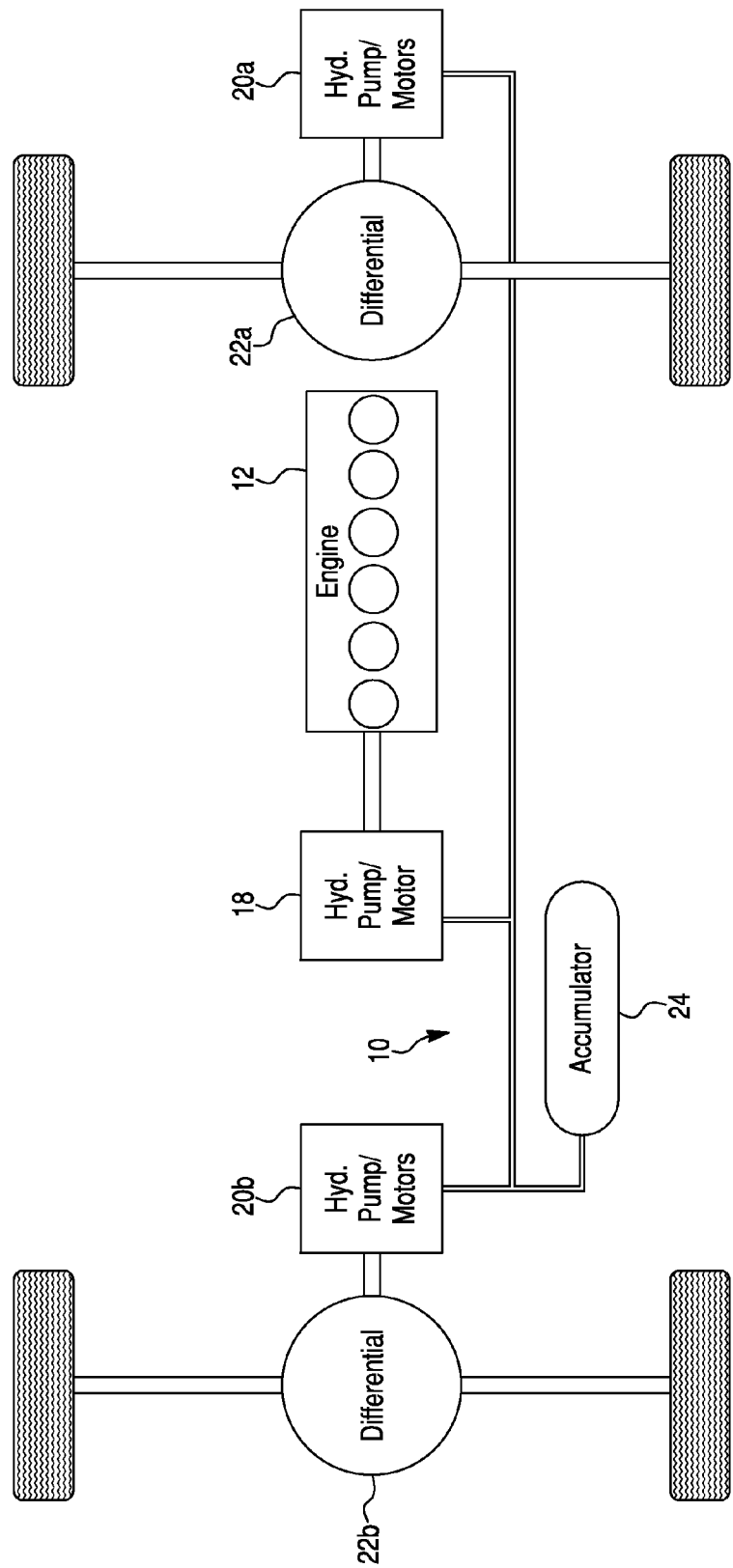
FIG. 10 is a tenth schematic diagram illustrating a vehicle drive train incorporating internal combustion engine that drives a hydraulic pump/motor.

In FIGS. 7-10, the IC engine 12 drives hydraulic pump/motor assembly 18 and respective dedicated pumps/motors 20a and 20b are provided for the front and rear differentials 22a and 22b or axle assemblies, respectively. An accumulator stores and delivers hydraulic power to and from the pumps. In FIG. 7 a clutch system 30 is provided between the IC engine 12 and the hydraulic pump/motor assembly 18. In FIGS. 8-10, the clutch system is omitted.

Figure 11:
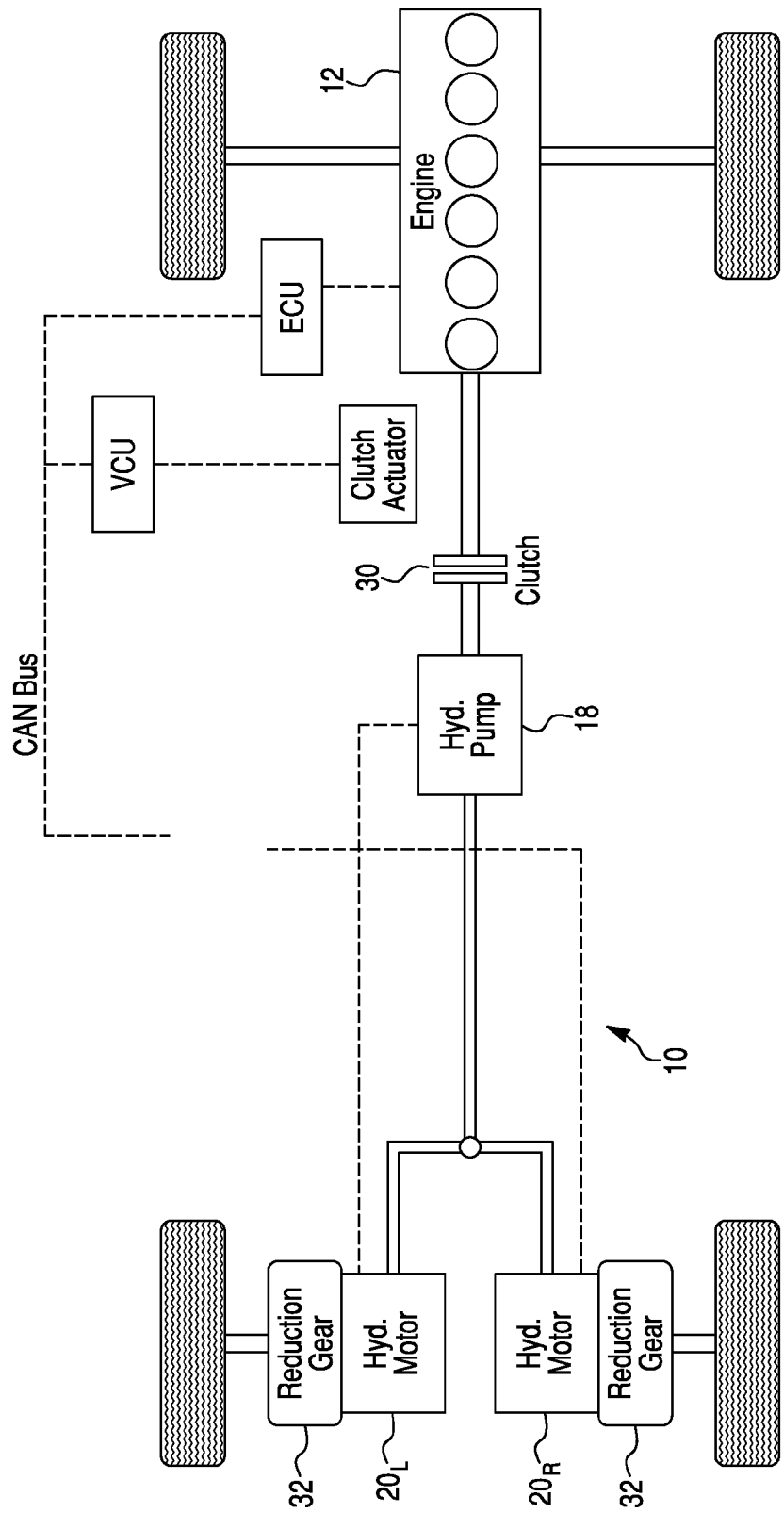
FIG. 11 is an eleventh schematic diagram illustrating a vehicle drive train incorporating internal combustion engine that drives a hydraulic pump/motor.
Figure 12:
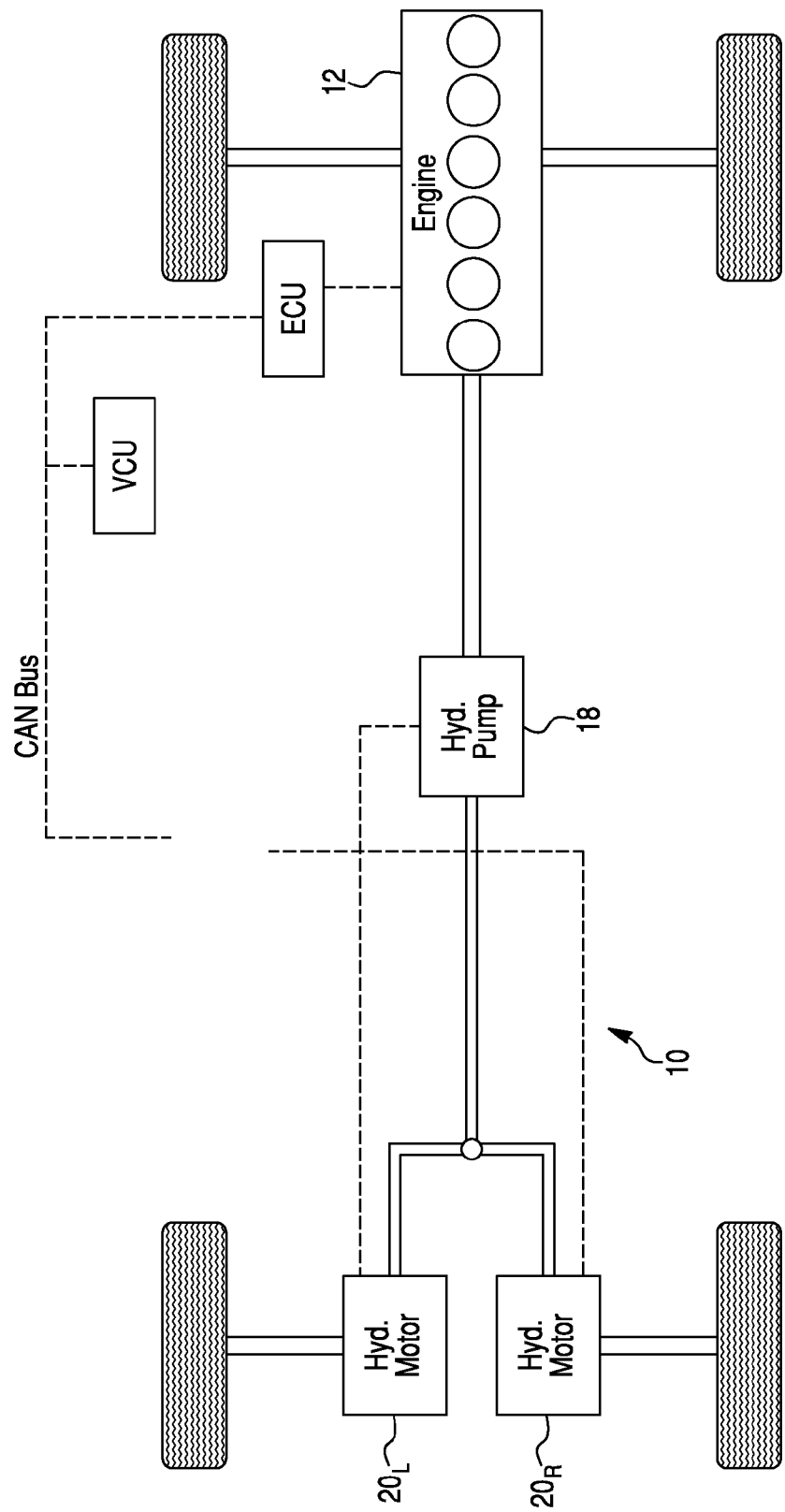
FIG. 12 is a twelfth schematic diagram illustrating a vehicle drive train incorporating internal combustion engine that drives a hydraulic pump/motor.

The embodiments in FIGS. 11 and 12 comprise a vehicle dive train 10 having an IC engine 12 as the primary source of torque which drives a hydraulic pump/motor 18 which, in turn, delivers torque to a pair of hydraulic motors $20_L$ and $20_R$ dedicated to each axle/wheel assembly. A controller area network (CAN) bus control system is used to control operation of the IC engine 12, hydraulic pump/motor 18, clutch systems 30, and the hydraulic pumps/motors $20_L$ and $20_R$ driving the wheels. In FIG. 11, reduction gearing 32 is provided between each dedicated hydraulic pump/motor ($20_L$ or $20_R$) and associated wheel end.

Figure 13:
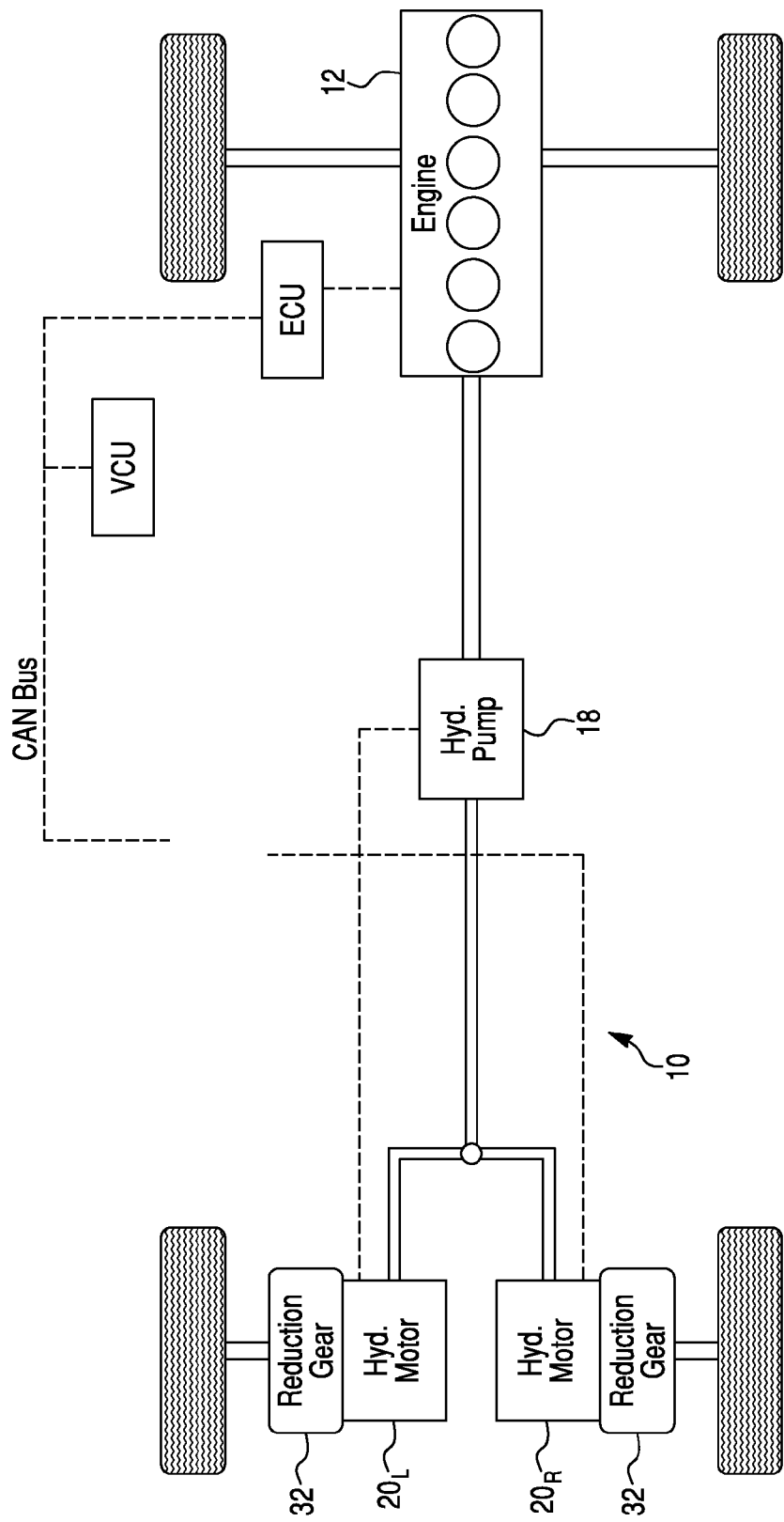
FIG. 13 is a thirteenth schematic diagram illustrating a vehicle drive train incorporating internal combustion engine that drives a hydraulic pump/motor.

The embodiment in FIG. 13 is similar to the embodiment in FIG. 11, omitting the clutch assemblies.

Figure 14:
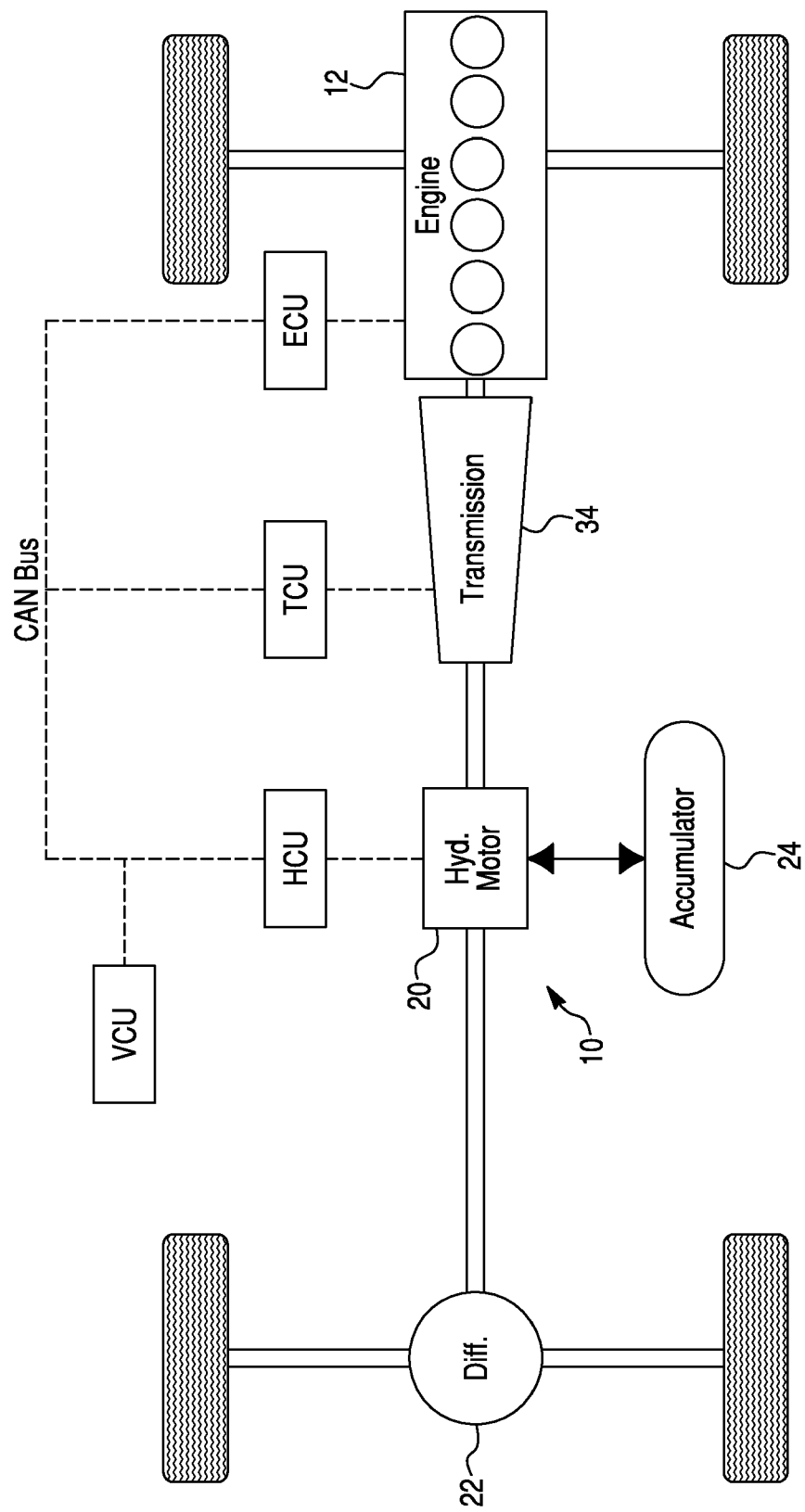
FIG. 14 is a schematic diagram illustrating a vehicle drive train incorporating an internal combustion engine that drives a transmission, which drives a hydraulic pump/motor.
Figure 15:
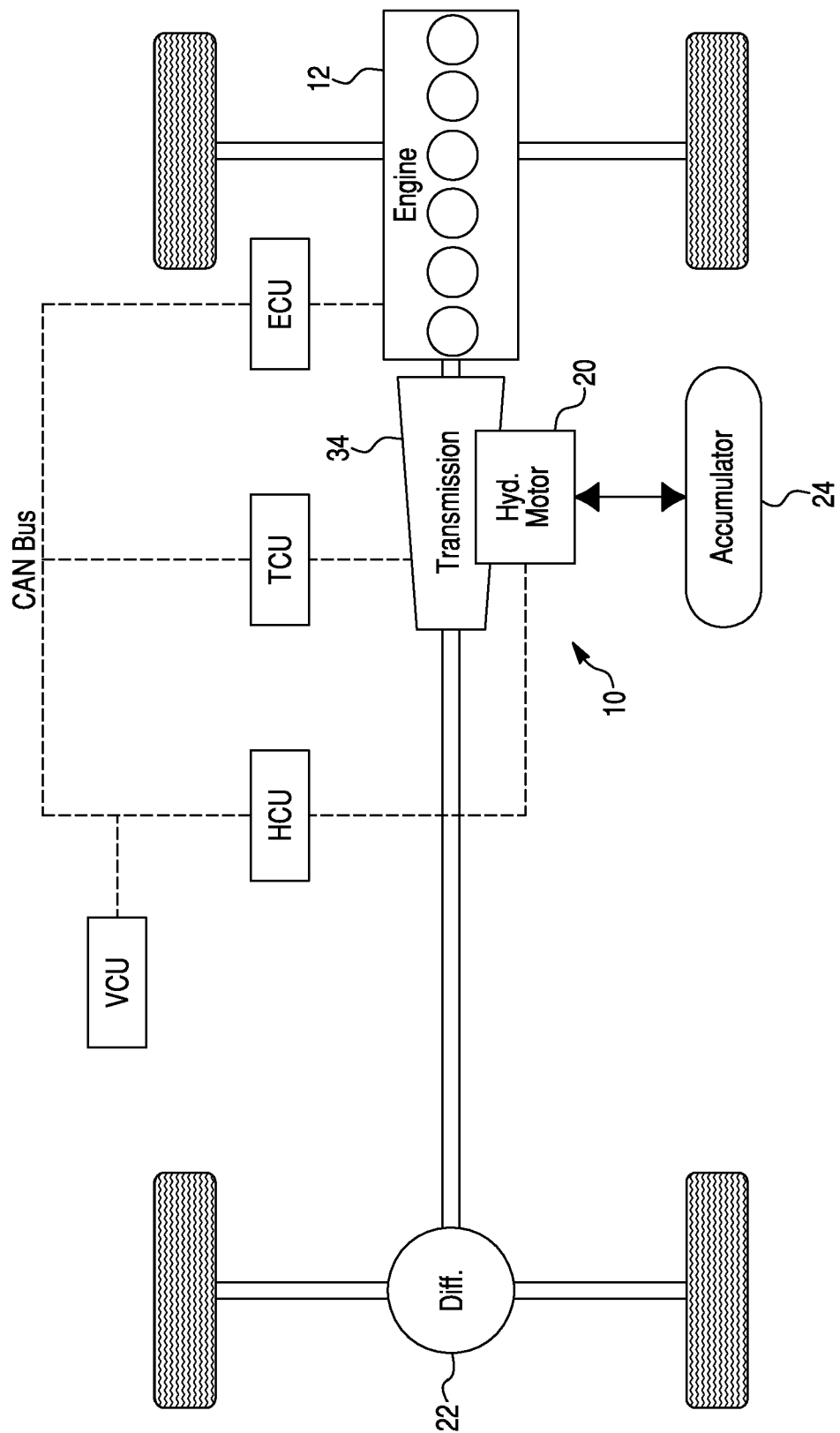
FIG. 15 is a second schematic diagram illustrating a vehicle drive train incorporating an internal combustion engine that drives a transmission, which drives a hydraulic pump/motor.
Figure 16:
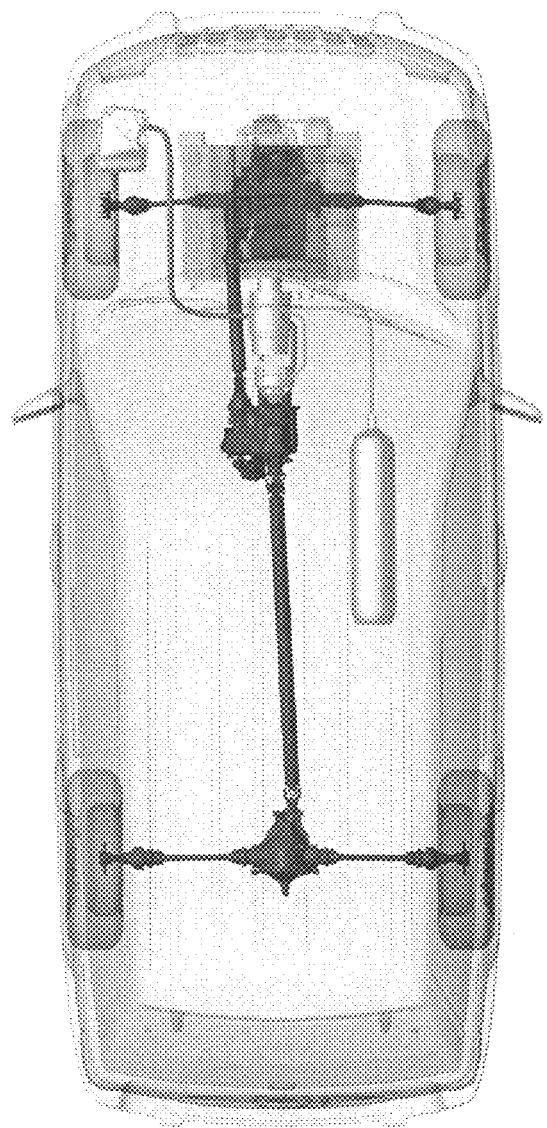
FIGS. 16-26 illustrate the systems layout of arrangements show in FIGS. 1-15 as applied to a particular vehicle.
Figure 17:
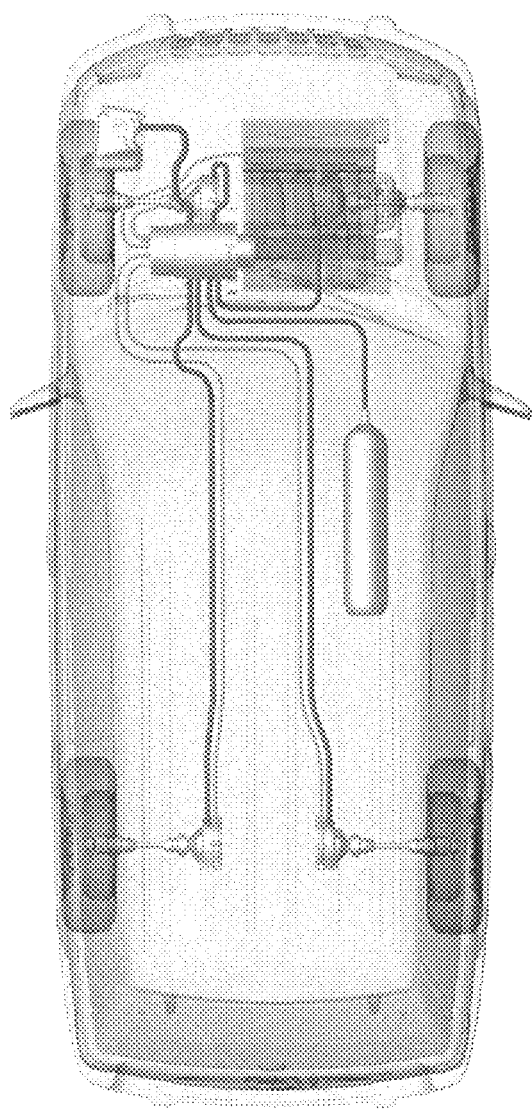
Figure 18:
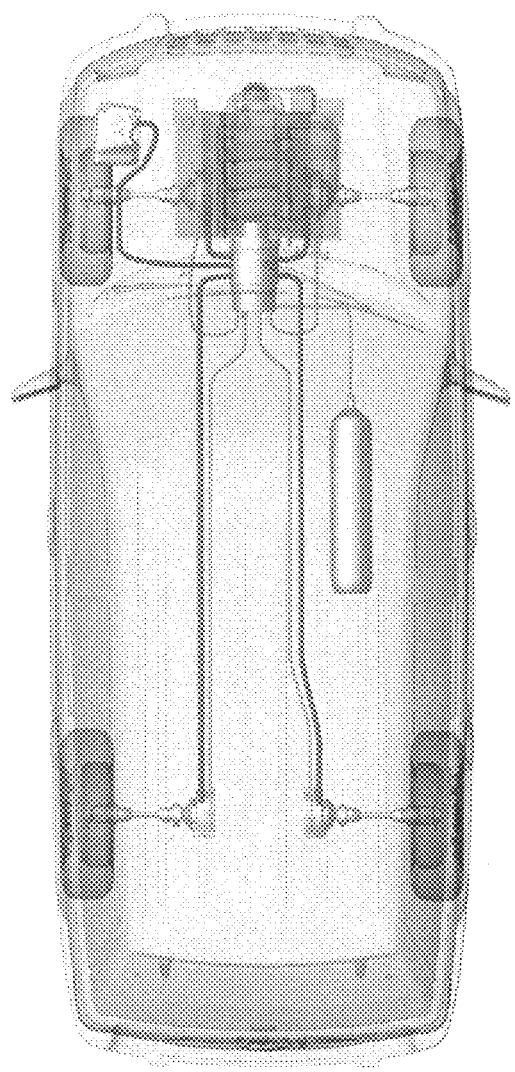
Figure 19:
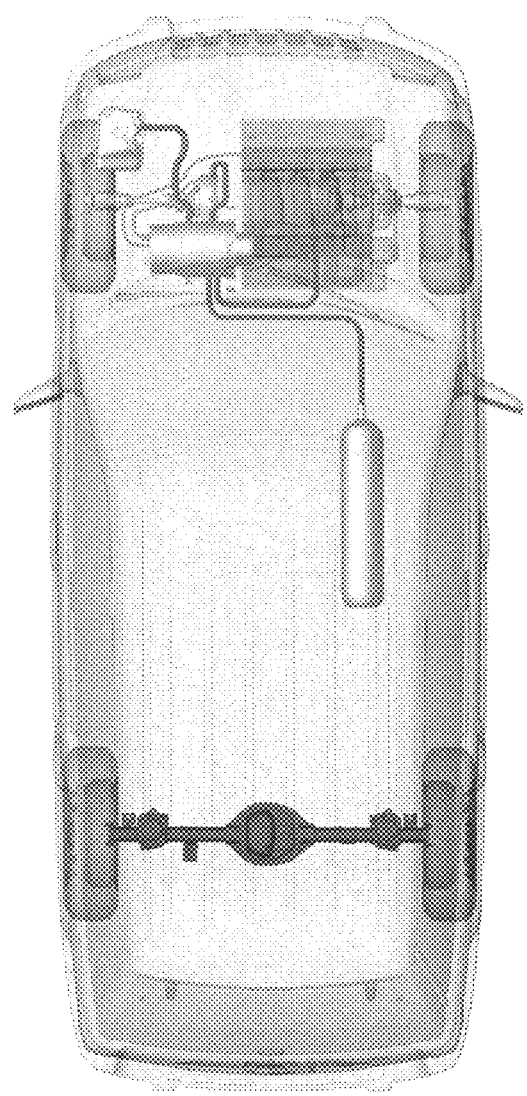
Figure 20:
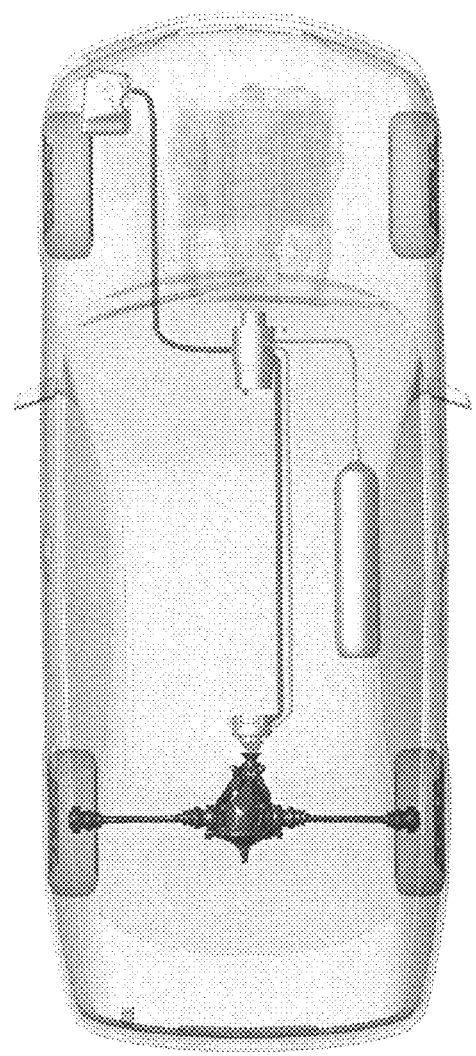
Figure 21:
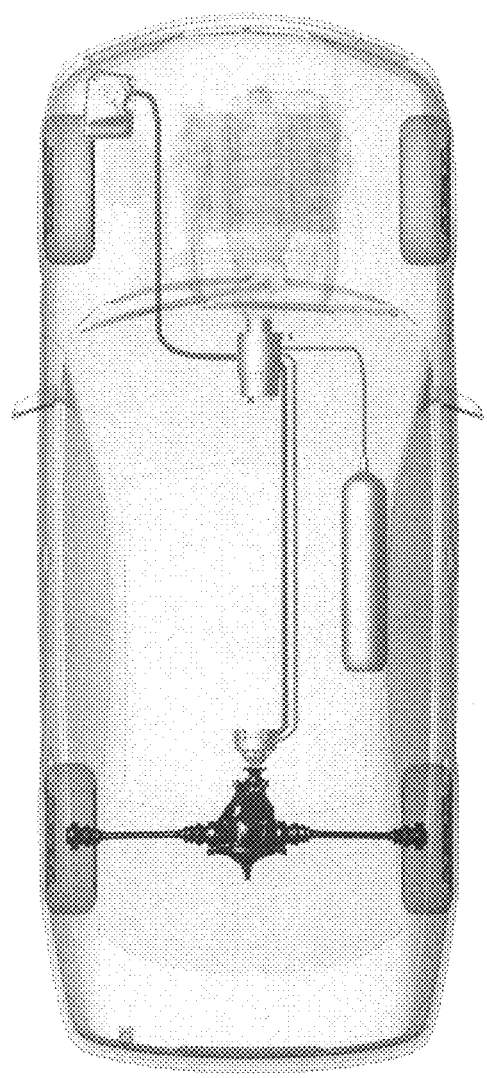
Figure 22:
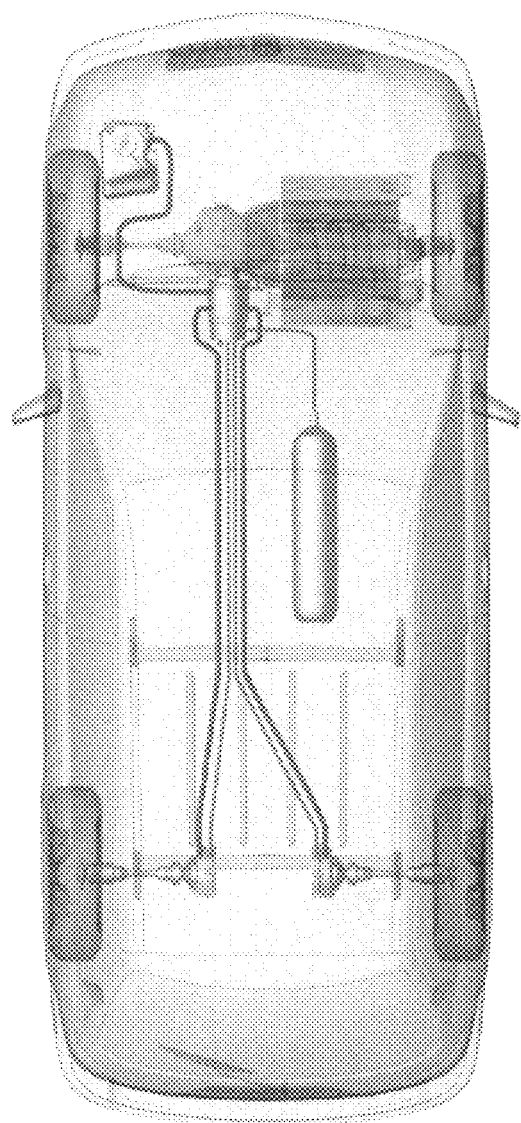
Figure 23:
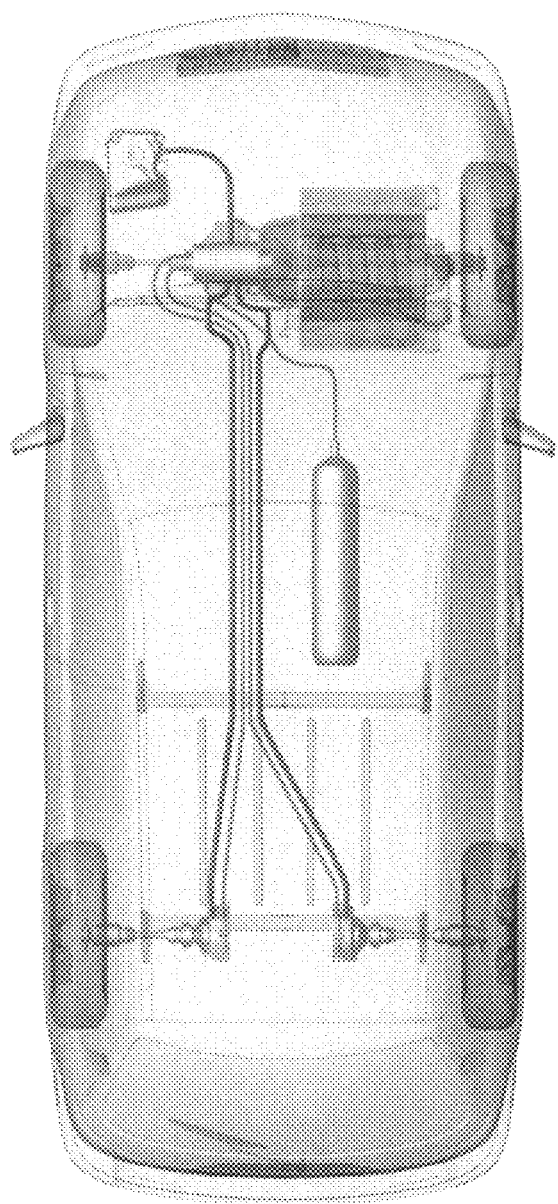
Figure 24:
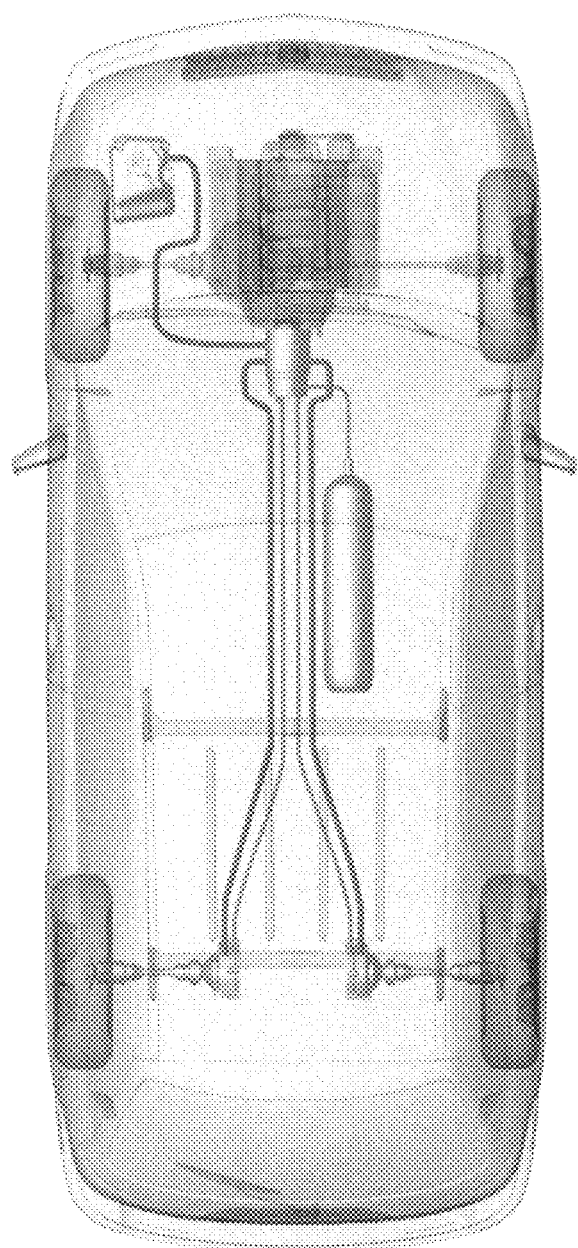
Figure 25:
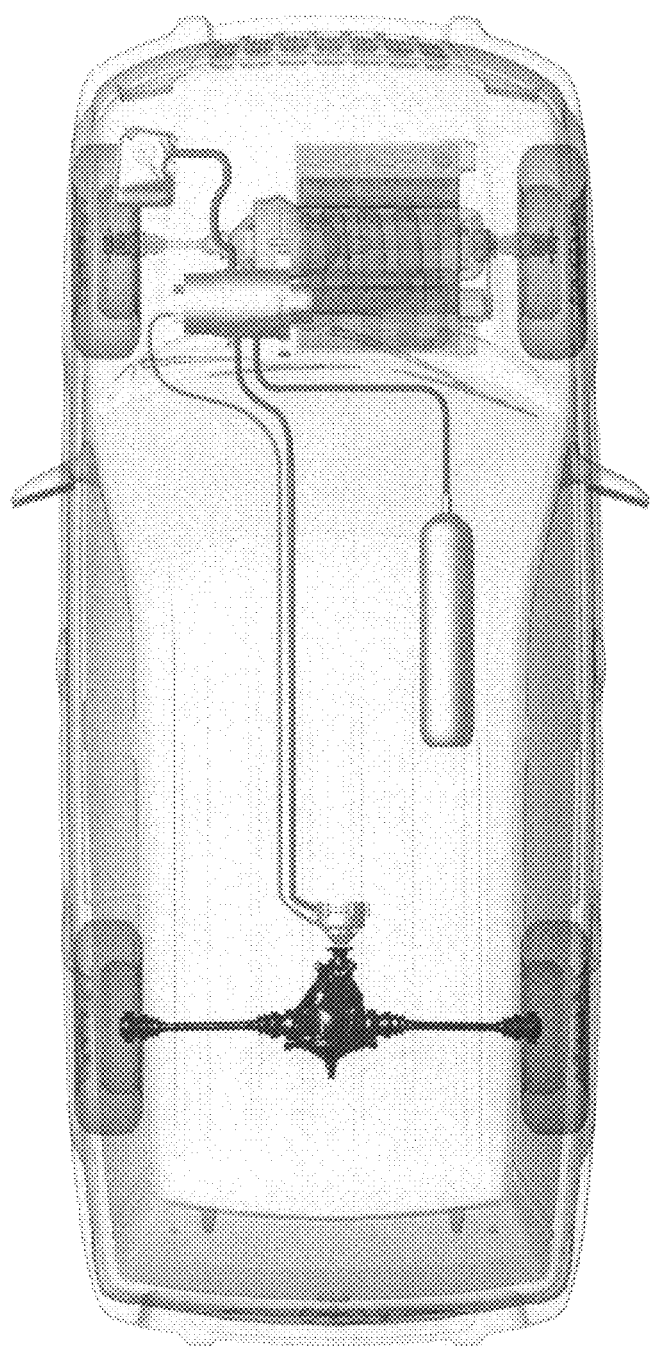
Figure 26:
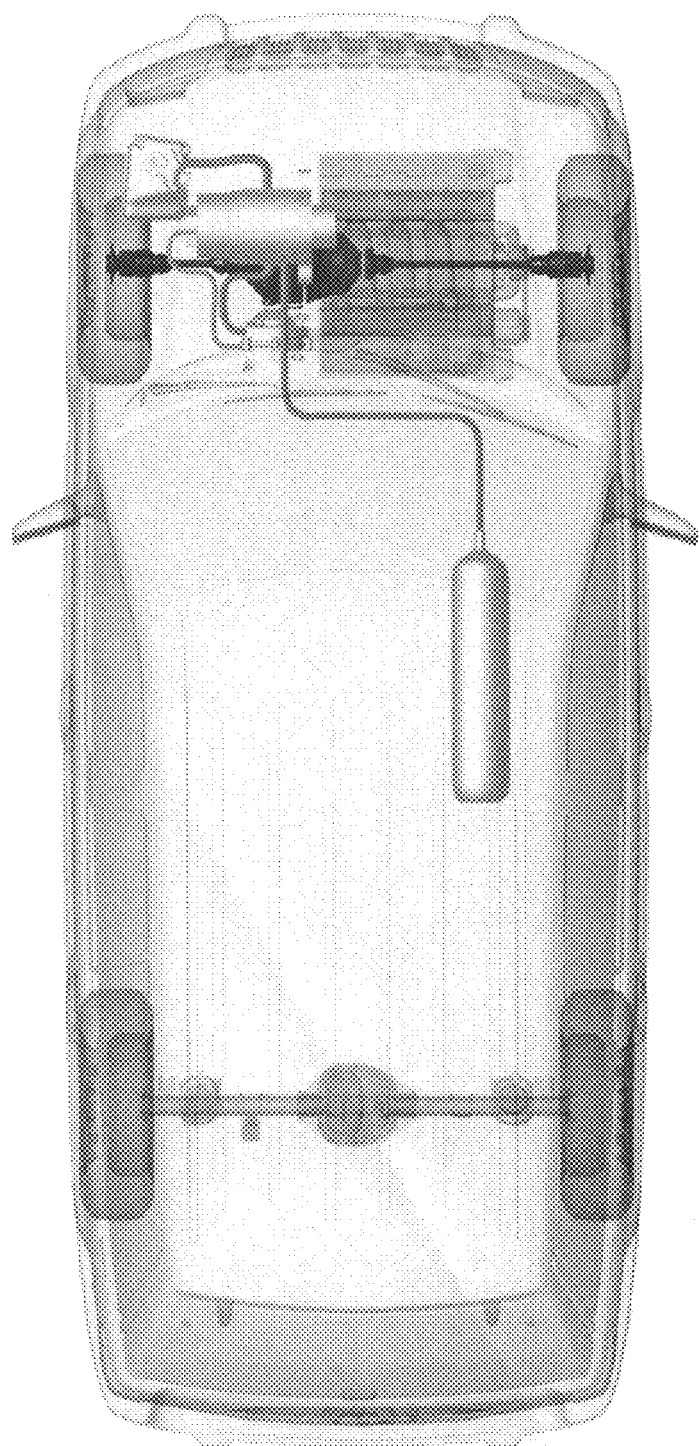

The embodiments in FIGS. 14 and 15 comprise a vehicle drive train 10 having an IC engine 12 as the primary source of torque which drives a mechanical transmission 34 which, in turn, delivers torque to a Digital Displacement hydraulic pump/motor 20 connected to the differential 22 of an axle/wheel assembly. A controller area network (CAN) bus control system is used to control operation of the IC engine 12, the transmission 34, and the hydraulic pump/motor 20 driving the wheels.

The invention claimed is:

1. A vehicle comprising:
a prime mover arranged to drive a first hydraulic machine,
a second hydraulic machine arranged to be driven by said first hydraulic machine via a fluid connection, said second hydraulic machine being connected to drive at least one wheel for propelling the vehicle, and
an auxiliary hydraulic pump/motor driven by said prime mover and drivingly coupled to said first hydraulic machine of said infinitely variable transmission so as to drive said first hydraulic machine;
wherein each of said first and second hydraulic machines is a digital displacement pump/motor capable to function both as a hydraulic pump and a hydraulic motor and having electronically-controllable valves for varying their speed and/or torque to provide an infinitely variable transmission for said vehicle.

2. The vehicle of claim 1, further comprising an accumulator for storing fluid pressurized by at least one of said hydraulic machines during braking of the vehicle.

3. The vehicle of claim 2, wherein said second hydraulic machine is operable in a motoring mode for driving the at least one wheel and in a pumping mode for pressurizing said fluid.

4. The vehicle of claim 1, wherein said second hydraulic machine is connected to a differential for driving at least two wheels of the vehicle.

5. The vehicle of claim 1, comprising a plurality of second hydraulic machines, each arranged to drive one wheel of the vehicle.

6. The vehicle of claim 2, wherein said accumulator is fluidly connected to both said first and second hydraulic machines.

7. The vehicle of claim 1, further comprising a hydraulic accumulator fluidly connected to said auxiliary hydraulic pump/motor.

8. The vehicle of claim 1, wherein said auxiliary hydraulic pump/motor is disposed between said prime mover and said infinitely variable transmission in series therewith.

9. A vehicle comprising:
   a prime mover arranged to drive a first hydraulic machine;
   a second hydraulic machine arranged to be driven by said first hydraulic machine via a fluid connection, said second hydraulic machine being connected to drive at least one wheel for propelling the vehicle; and
   an accumulator for storing fluid pressurized by at least one of said hydraulic machines during braking of the vehicle;
   wherein each of said first and second hydraulic machines is a digital displacement pump/motor capable to function both as a hydraulic pump and a hydraulic motor and having electronically-controllable valves for varying their speed and/or torque to provide an infinitely variable transmission for said vehicle, and
   wherein the first hydraulic machine is coupled to the prime-mover by a clutch so that energy of the pressurized hydraulic fluid can be retrieved from the accumulator and used to drive the first hydraulic machine as a pump so as to drive the second hydraulic machine as a motor to provide motive power for the vehicle while the prime-mover is decoupled and switched off.

\* \* \* \* \*